(12) United States Patent
Srivastava et al.

(10) Patent No.: US 10,336,417 B2
(45) Date of Patent: *Jul. 2, 2019

(54) REMOTELY OPERATED VEHICLE CONTROL COMMUNICATION SYSTEM AND METHOD OF USE

(71) Applicant: OCEANEERING INTERNATIONAL, INC., Houston, TX (US)

(72) Inventors: Govind Shil Dayal Srivastava, Austin, TX (US); Greg Robert Boyle, Camarillo, CA (US)

(73) Assignee: Oceaneering International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,782

(22) Filed: Apr. 24, 2015

(65) Prior Publication Data

US 2015/0309509 A1 Oct. 29, 2015

Related U.S. Application Data

(60) Provisional application No. 61/984,670, filed on Apr. 25, 2014.

(51) Int. Cl.
| | |
|---|---|
| *B63G 8/00* | (2006.01) |
| *B63G 8/14* | (2006.01) |
| *G05D 1/00* | (2006.01) |
| *H04L 29/06* | (2006.01) |
| *B60C 23/00* | (2006.01) |

(52) U.S. Cl.
CPC ............. *B63G 8/001* (2013.01); *B63G 8/14* (2013.01); *G05D 1/0022* (2013.01); *B60C 23/00* (2013.01); *B63G 2008/007* (2013.01); *H04L 63/10* (2013.01)

(58) Field of Classification Search
CPC .... B63G 8/001; B63G 8/14; B63G 2008/007; G05D 1/0022
USPC .......................................................... 701/2
See application file for complete search history.

(56) References Cited

U.S. PATENT DOCUMENTS

| | | | | |
|---|---|---|---|---|
| 6,623,089 B2 * | 9/2003 | Amberkar | ............... | B60T 8/172 |
| | | | | 303/146 |
| 7,519,458 B2 * | 4/2009 | Buckley | ................ | G01M 17/00 |
| | | | | 701/2 |
| 7,991,583 B2 * | 8/2011 | Balzer | ............... | B60W 50/0205 |
| | | | | 702/183 |
| 9,008,906 B2 * | 4/2015 | Ricci | ........................ | G06F 17/00 |
| | | | | 701/36 |
| 9,055,022 B2 * | 6/2015 | Ricci | ...................... | G06F 3/0484 |
| 9,079,461 B2 * | 7/2015 | Suh | ......................... | B60C 23/02 |
| 9,088,572 B2 * | 7/2015 | Ricci | ........................ | H04L 63/10 |
| 9,121,323 B2 * | 9/2015 | Feldmann | ............. | F01N 3/2066 |

(Continued)

*Primary Examiner* — McDieunel Marc
(74) *Attorney, Agent, or Firm* — Maze IP Law, P.C.

(57) ABSTRACT

For remotely operated vehicles (ROV) deployed subsea, communications between an ROV and a system remote from the ROV may use a remotely operated vehicle control communication system to achieve simultaneous and/or discrete data communications at two differing data transmission speeds using two differing data protocols over a common signal transmission pathway configured for use subsea at the first data transmission speed and the second data transmission speed, either separately or concurrently.

19 Claims, 3 Drawing Sheets

(56) References Cited

U.S. PATENT DOCUMENTS

| | | | |
|---|---|---|---|
| 9,233,645 B2* | 1/2016 | Schofield | B60C 23/00 |
| 9,606,022 B2* | 3/2017 | Kumar | G01M 15/02 |
| 2015/0012232 A1* | 1/2015 | Mercer | G06F 11/0709 |
| | | | 702/58 |

* cited by examiner

REMOTELY OPERATED VEHICLE CONTROL COMMUNICATION SYSTEM AND METHOD OF USE

RELATION TO PRIOR APPLICATIONS

This application claims the benefit of, and priority through, U.S. Provisional Application 61/984,670, titled "Remotely Operated Vehicles and Components," filed Apr. 25, 2014.

FIELD OF THE INVENTION

The following relates generally to data transmission to and from a subsea remotely operated vehicle.

BACKGROUND

Many issues are currently facing the remotely operated vehicle (ROV) market, including environmental challenges; complexity and variety of intervention services requiring configurable and scalable intervention capabilities; and increased video, telemetry and sensor needs requiring increased bandwidth and scalability. Improved reliability and operability by design and selection may include new and/or optimized systems and easier and faster diagnosis and repairs as well as integrated failure diagnostics and support for Ethernet based communications.

Generally, systems using slower data transmission speeds and their data protocols, e.g. RS-232, RS-422 or RS-485, boot up in seconds. However, systems using faster data transmission speeds and their protocols, e.g. Ethernet, take longer to boot which can be dangerous at depth and around structures, vessels, and the like. There is also an advantage in the redundant systems because in case one side goes down completely at least partial control of a subsea system and/or device may be accomplished via an alternative back-up system using different core technology.

FIGURES

The figures supplied herein disclose various embodiments of the claimed inventions.

Figure 1:
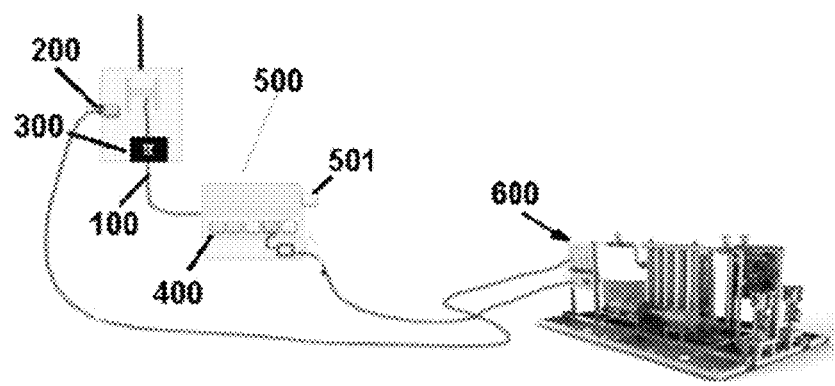
Figure 2:
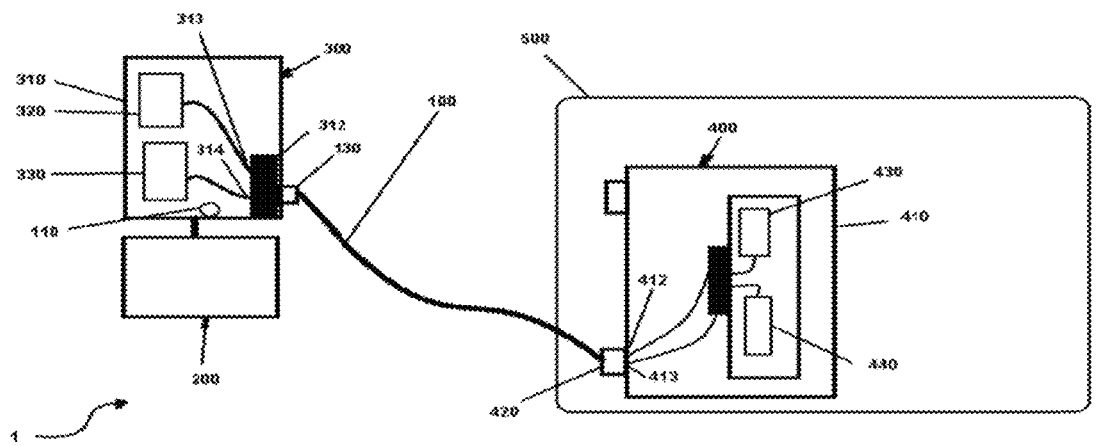
Figure 3:
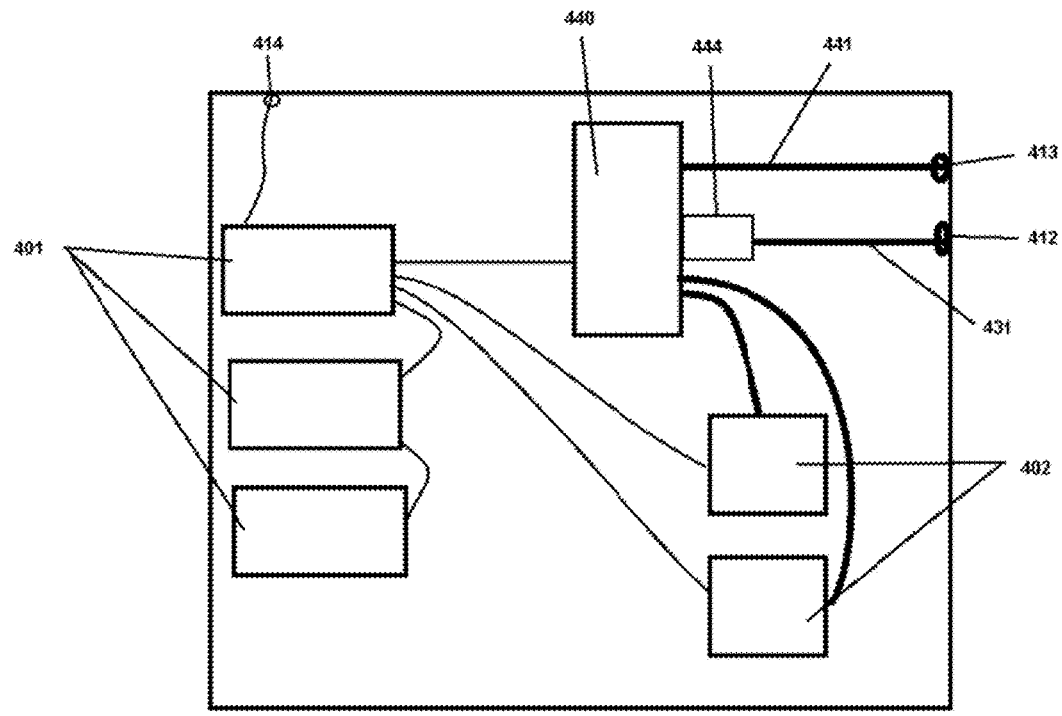
Figure 4:
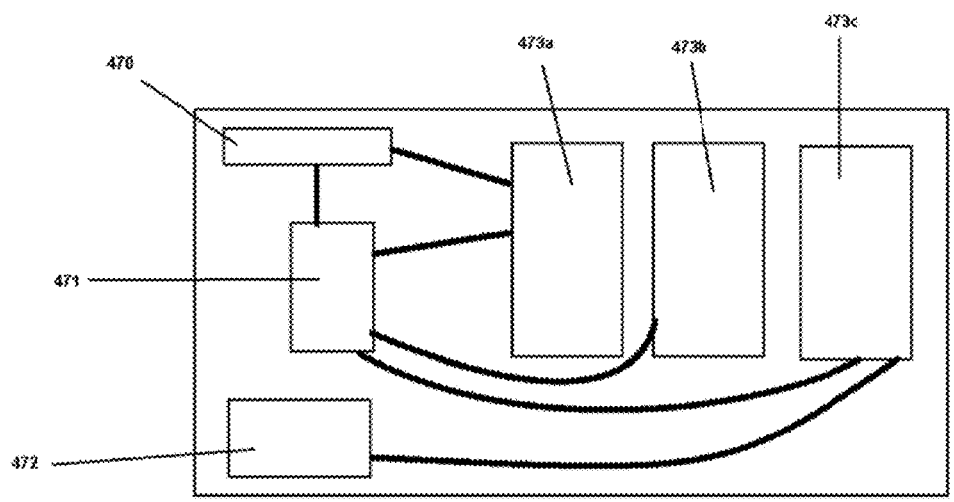
Figure 5:
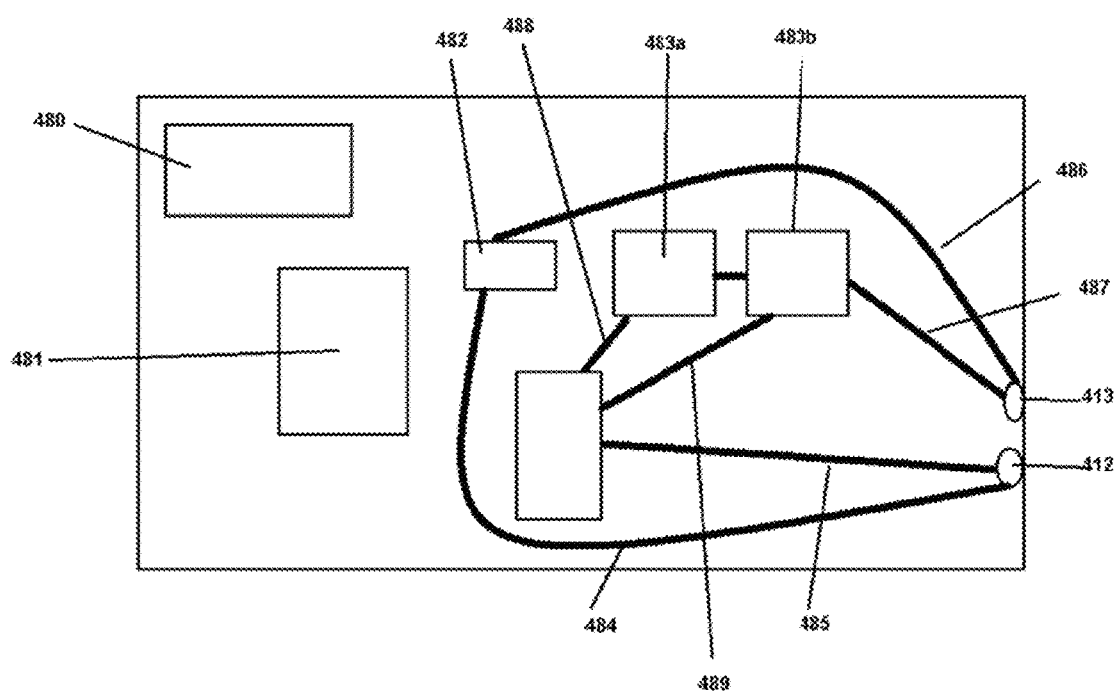

FIG. 1 is a block diagram of an exemplary subsea system;
FIG. 2 is a block diagram of an exemplary remotely operated vehicle control communication system;
FIG. 3 is a block diagram of exemplary components of the remotely operated vehicle control communication system;
FIG. 4 is a block diagram of exemplary components of the remotely operated vehicle control communication system; and
FIG. 5 is a block diagram of exemplary components of the remotely operated vehicle control communication system.

DESCRIPTION OF VARIOUS EMBODIMENTS

Referring now to FIG. 1, control system 1 comprises signal transmission pathway 100 configured for use subsea with a first data transmission protocol at a first data transmission speed and with a second data transmission protocol at a second data transmission speed, either separately or concurrently; system controller 200; first data communication module 300; and remotely operated vehicle module 400.

First data communication module 300 and remotely operated vehicle module 400 typically comprise a scalable modular design which may be configured to be set up prior to deployment to support the first data transmission protocol and the second data transmission protocol operating concurrently and independently on signal transmission pathway 100. In other embodiments, first data communication module 300 and remotely operated vehicle module 400 comprise a scalable modular design configured to be set up prior to deployment to support the first data transmission protocol and the second data transmission protocol operating sequentially on the same signal transmission pathway 100.

The first data transmission protocol typically comprises RS232, RS-422 or RS-485 at first data transmission speeds of up to 56 kilobaud and the second data transmission protocol typically comprises Ethernet at second data transmission speeds of up to 1 gigabit. These speeds are merely exemplary, however.

First data communication module 300 comprises first housing 310; first data connector 312 configured to operatively couple with signal transmission pathway 100; first signal protocol transceiver 320; and second signal protocol transceiver 330.

First data connector 312 comprises a first set of connections 313 operative at the first data transmission speed and a second set of connections 314 operative at the second data transmission speed.

First signal protocol transceiver 320 is disposed at least partially within first housing 310 and is operatively in communication with first data connector 312, e.g. via first set of connections 313, and system controller 200. First signal protocol transceiver 320 is configured to use a first data protocol at the first data transmission speed over signal transmission pathway 100.

Second signal protocol transceiver 330 is disposed at least partially within first housing 310 and is operatively in communication with first data connector 312, e.g. via second set of connections 314, and system controller 200. Second signal protocol transceiver 330 is configured to use a second data protocol at the second data transmission speed which is faster than the first data transmission speed over signal transmission pathway 100.

Remotely operated vehicle module 400 comprises second housing 410 configured to be disposed at least partially within remotely operated vehicle (ROV) 500 and is configured for use subsea; second data connector 420; third signal protocol transceiver 430; and fourth signal protocol transceiver 440. In embodiments, each of third signal protocol transceiver 430 and fourth signal protocol transceiver 440 may further comprise atmospherically adjusted containers, e.g. one atmosphere containers.

Second data connector 420 is configured to operatively couple with signal transmission pathway 100 and comprises a third set of connections 412 operative at the first data transmission speed and a fourth set of connections 413 operative at the second data transmission speed.

Third signal protocol transceiver 430 is disposed at least partially within second housing 410 and is operatively in communication with second data connector 420 via third set of connections 412, signal transmission pathway 100, and, when connected to signal transmission pathway 100, first signal protocol transceiver 230. Third signal protocol transceiver 430 is configured to use the first data protocol at the first data transmission speed over signal transmission pathway 100 and further configured to operatively interface with a first device subsea. By way of example and not limitation, remotely operated vehicle module 400 may comprise power module 401 as the first device subsea or as part of the first device subsea.

Fourth signal protocol transceiver 440 is disposed at least partially within second housing 410 and is operatively in communication with second data connector 420 via fourth set of connections 413, signal transmission pathway 100, and second signal protocol transceiver 420. Fourth signal protocol transceiver 440 is configured to use the second data protocol at the second data transmission speed over signal transmission pathway 100 and is further configured to operatively interface with a second device subsea, e.g. a video camera, sonar, or tooling.

First data connector 312 and second data connector 420 may be further configured such that how they interface with signal transmission pathway 100 determines which data protocol each will support via signal transmission pathway 100.

Signal transmission pathway 100 typically comprises fiber. Where fiber is used, fiber multiplex system 130 may be present and operatively in communication with data controller 120.

Data transmission sensor 110 may be present and operatively in communication with data controller 120. Data controller 120 is typically configured to selectively effect data communications via only first signal protocol transceiver 320 and third signal protocol transceiver 430, only second signal protocol transceiver 330 and fourth signal protocol transceiver 440, or concurrently over both first signal protocol transceiver 320 and third signal protocol transceiver 430 and second signal protocol transceiver 330 and fourth signal protocol transceiver 440, each at their respective data transmission speeds using their respective data transmission protocols.

Referring now to FIG. 3, one or more power supplies 401. In typical configurations, these power supplies obtain electrical power from ROV 100, e.g. at power connector 414, and then distribute the power to one or more signal protocol transceivers such as fourth signal protocol transceiver 440. One or more fourth signal protocol transceivers 440 is connected, such as by cable 441, to fourth set of connections 413 and/or third set of connections 412. In certain embodiments, each of fourth set of connections 413 and third set of connections 412 comprises a set of connectors such as pins which operate to provide either Ethernet or similar signaling, e.g. RJ-45, or serial or similar signaling, e.g. RS-232. Thus, although connector sets 412,413 may be identical, the signaling they carry can vary. By way of example and not limitation, fourth set of connections 413 may be prewired for RJ45 connections and cable 441 can function as a twisted pair Ethernet cable. Similarly, third set of connections 412 may be prewired for serial connections such as RS-232 or RS-422 and cable 431 can function as a serial data cable.

In certain embodiments, fast-to-slow protocol converter 444 may be disposed intermediate fourth signal protocol transceivers 440 and a member of the set of connections 412, 413.

One or more fuses 402 may be present and operatively disposed intermediate a signal protocol transceiver.

Referring now to FIG. 4, terminator and transformer 470 may be disposed in ROV 100 and provide power distribution to modules within ROV 100, including one or more power units 472. Communications controller 471 can be similarly disposed and be in communication with one or more sensor modules 473a-473c which can be modular and interchanged such as prior to deployment. Sensor modules 473a-473c may be configured to use the first data transmission protocol at the first data transmission speed, the second data transmission protocol at the second data transmission speed, or either.

Referring additionally to FIG. 5, power unit 480 can be disposed remotely operated vehicle module 400 and provide power to one or more components in remotely operated vehicle module 400. Communication controller 481 may be present and monitor status of various components such as multiplexer 482 and/or one or more telemetry modules 483a-483b. In embodiments, telemetry modules 483a-483b are modular and can be selected and configured such as prior to deployment. In addition, telemetry modules 483a-483b may be provided with serial data communications handling ability, such as for RS-232, RS-422, RS-485, and the like; with faster data communications handling ability, such as for Ethernet; or the like; or a combination thereof. Various internal data signal pathways such as signal pathway 484, signal pathway 485, signal pathway 486, and signal pathway 487 are typically used to interconnect the various components.

In the operation of exemplary embodiments, communications between ROV 500 and a system remote from ROV 500 may be effected by operatively connecting ROV 500 and a system remote from ROV 500 using control system 1, which is as described above. Once connected, transceivers 320 and/or 330 are operatively interconnected to transceivers 430 and 440, respectively, over signal transmission pathway 100 to selectively provide data transmission between ROV 500 and the system remote from ROV 500 at their respective data transmission speeds. Typically, the first data protocol is used to communicate with a core ROV system at the first data transmission speed, e.g. 9600 to 56000 baud, and the second data protocol used to communicate with less important systems and/or a subsea tool at the second data transmission speed, e.g. tool 501 illustrated as part of subsea package 600. If fiber is used, the differing protocols may use differing light wavelengths.

A state of ROV 500 may be monitored in real time, such as by using data transmission sensor 110 and data controller 120. If a first predetermined state event occurs, e.g. a data failure or data error rate in excess of a predetermined limit, data transmission may be switched over to, or exclusively to, first signal protocol transceiver 320 and third signal protocol transceiver 430 to provide an alternative data signaling pathway. This can also occur if the predetermined state event comprises a need to reboot ROV 500 or reboot or otherwise restart any other system operatively in communication with ROV 500. In other embodiments, the predetermined state event may comprise a need to bring an offline ROV system or other offline system operatively in communication with ROV 500 back on line after they have been in "off-power" or "low-power" mode.

The state of ROV 500 may continue to be monitored and, if a second predetermined state event occurrence is detected, use of first signal protocol transceiver 320 and third signal protocol transceiver 330 may be discontinued, either totally or partially, to provide a further alternative data signaling pathway upon detection of the second predetermined state event occurrence. This can include resuming data transmission using second signal protocol transceiver 230 and fourth signal protocol transceiver 440, either exclusively or in combination with first signal protocol transceiver 320 and third signal protocol transceiver 330.

In certain embodiments, first signal protocol transceiver 320 and third signal protocol transceiver 330 are transmitting at the first data transmission speed and, concurrently, second signal protocol transceiver 230 and fourth signal protocol transceiver 440 are transmitting at the second data transmission speed over signal transmission pathway 100. In certain of these embodiments, first signal protocol transceiver 320 and third signal protocol transceiver 330 may be cross-connected with second signal protocol transceiver 230 and fourth signal protocol transceiver 440 for diagnostics information subsea.

In other embodiments, only the second data protocol at the second data transmission speed is enabled, e.g. only second signal protocol transceiver 230 and fourth signal protocol transceiver 440 are used. However, fast protocol to slow protocol module 444 may be added and used to allow slow protocol data transmission. The allowed slow protocol data transmission typically comprises RS-232, RS-422, RS-485, or the like.

The foregoing disclosure and description of the invention is illustrative and explanatory. Various changes in the size, shape, and materials, as well as in the details of the illustrative construction and/or an illustrative method may be made without departing from the spirit of the invention.

What is claimed is:

1. A remotely operated vehicle control communication system, comprising:
    a. a signal transmission pathway configured for use subsea at a first data transmission speed and at a second data transmission speed, either separately or concurrently;
    b. a system controller;
    c. a first data communication module, comprising:
        i. a first housing;
        ii. a first data connector configured to operatively couple with the signal transmission pathway, the first data connector comprising a first set of connections operative at the first data transmission speed and a second set of connections operative at the second data transmission speed;
        iii. a first signal protocol transceiver disposed at least partially within the first housing and operatively in communication with the first data connector and the system controller, the first signal protocol transceiver configured to use a first data protocol at the first data transmission speed over the signal transmission pathway;
        iv. a second signal protocol transceiver disposed at least partially within the first housing and operatively in communication with the first data connector and the system controller, the second signal protocol transceiver configured to use a second data protocol at the second data transmission speed faster than the first data transmission speed over the signal transmission pathway; and
    d. a remotely operated vehicle module, comprising:
        i. a second housing configured to be disposed at least partially within a remotely operated vehicle, the second housing further configured for use subsea;
        ii. a second data connector configured to operatively couple with the signal transmission pathway, the second data connector comprising a third set of connections operative at the first data transmission speed and a fourth set of connections operative at the second data transmission speed;
        iii. a third signal protocol transceiver disposed at least partially within the second housing and operatively in communication with the second data connector, the signal transmission pathway, and the first signal protocol transceiver, the third signal protocol transceiver configured to use the first data protocol at the first data transmission speed over the signal transmission pathway, the third signal protocol transceiver further configured to operatively interface with a first device subsea; and
        iv. a fourth signal protocol transceiver disposed at least partially within the second housing operatively in communication with the second data connector, the signal transmission pathway, and the second signal protocol transceiver, the fourth signal protocol transceiver configured to use the second data protocol at the second data transmission speed over the signal transmission pathway, the fourth signal protocol transceiver further configured to operatively interface with a second device subsea.

2. The remotely operated vehicle control communication system of claim 1, wherein the signal transmission pathway comprises fiber.

3. The remotely operated vehicle control communication system of claim 1, wherein the first signal protocol transceiver and third signal protocol transceiver are configured to use at least one of RS232, RS-422 or RS-485.

4. The remotely operated vehicle control communication system of claim 1, wherein the third signal protocol transceiver and fourth signal protocol transceiver are configured to use Ethernet.

5. The remotely operated vehicle control communication system of claim 1, further comprising:
    a. a data transmission sensor; and
    b. a data controller operatively in communication with the data transmission sensor and configured to selectively effect data communications via only the first and third signal protocol transceivers, only the second and fourth signal protocol transceivers, or concurrently over both the first and third signal protocol transceivers and the second and fourth signal protocol transceivers.

6. The remotely operated vehicle control communication system of claim 5, further comprising a fiber multiplex system operatively in communication with the data controller.

7. The remotely operated vehicle control communication system of claim 1, wherein:
    a. the remotely operated vehicle module comprises a power module; and
    b. the first device subsea comprises the power module.

8. The remotely operated vehicle control communication system of claim 1, wherein the first data communication module and the remotely operated vehicle module comprise a scalable modular design configured to be set up prior to deployment to support the first and second data signals operating concurrently and independently on the signal transmission pathway.

9. The remotely operated vehicle control communication system of claim 1, wherein the first and third signal processors comprise a scalable modular design configured to be set up prior to deployment to support the first and second data signals operating sequentially on the same signal transmission pathway.

10. The remotely operated vehicle control communication system of claim 1, wherein the first data connector and the second data connector are further configured such that how they interface with the signal transmission pathway determines which protocol the first data connector and the second data connector will support via the signal transmission pathway.

11. A method of communicating between a remotely operated vehicle (ROV) and a system remote from the ROV, comprising:

a. operatively connecting a remotely operated vehicle (ROV) and a system remote from the ROV using a control system, the control system comprising:
   i. a signal transmission pathway configured for use subsea at a first data transmission speed and at a second data transmission speed, either separately or concurrently;
   ii. a system controller;
   iii. a first data communication module, comprising:
      1. a first housing;
      2. a first data connector configured to operatively couple with the signal transmission pathway, the first data connector comprising a first set of connections operative at the first data transmission speed and a second set of connections operative at the second data transmission speed;
      3. a first signal protocol transceiver disposed at least partially within the first housing and operatively in communication with the first data connector and the system controller, the first signal protocol transceiver configured to use a first data protocol at the first data transmission speed over the signal transmission pathway;
      4. a second signal protocol transceiver disposed at least partially within the first housing and operatively in communication with the first data connector and the system controller, the second signal protocol transceiver configured to use a second data protocol at the second data transmission speed faster than the first data transmission speed over the signal transmission pathway; and
   iv. a remotely operated vehicle module, comprising:
      1. a second housing configured to be disposed at least partially within a remotely operated vehicle, the second housing further configured for use subsea;
      2. a second data connector configured to operatively couple with the signal transmission pathway, the second data connector comprising a third set of connections operative at the first data transmission speed and a fourth set of connections operative at the second data transmission speed;
      3. a third signal protocol transceiver disposed at least partially within the second housing and operatively in communication with the second data connector, the remotely operated vehicle module, and the first signal protocol transceiver, the third signal protocol transceiver configured to use the first data protocol at the first data transmission speed over the signal transmission pathway, the third signal protocol transceiver further configured to operatively interface with a first device subsea; and
      4. a fourth signal protocol transceiver disposed at least partially within the second housing operatively in communication with the second data connector, the remotely operated vehicle module, and the second signal protocol transceiver, the fourth signal protocol transceiver configured to use the second data protocol at the second data transmission speed over the signal transmission pathway, the fourth signal protocol transceiver further configured to operatively interface with a second device subsea; and
b. using the transceivers in the first data communication module and the remotely operated vehicle module to selectively provide data transmission between the ROV and the system remote from the ROV at their respective data transmission speeds.

12. The method of communicating between a remotely operated vehicle (ROV) and a system remote from the ROV of claim 11, further comprising:
   a. monitoring a state of the ROV in real time; and
   b. using the first signal protocol transceiver and the third signal protocol transceiver to provide an alternative data signaling pathway if a first predetermined state event occurs.

13. The method of communicating between a remotely operated vehicle (ROV) and a system remote from the ROV of claim 12, wherein the predetermined state event comprises a need to reboot the ROV or any other system operatively in communication with the ROV.

14. The method of communicating between a remotely operated vehicle (ROV) and a system remote from the ROV of claim 12, wherein the predetermined state event comprises a need to bring an offline ROV system or offline system operatively in communication with the ROV back on line after they have been in "off-power" or "low-power" mode.

15. The method of communicating between a remotely operated vehicle (ROV) and a system remote from the ROV of claim 11, further comprising:
   a. continuing to monitor a state of the ROV;
   b. detecting a second predetermined state event occurrence; and
   c. discontinuing using the first signal protocol transceiver and the third signal protocol transceiver to provide an alternative data signaling pathway upon detection of the second predetermined state event occurrence.

16. The method of communicating between a remotely operated vehicle (ROV) and a system remote from the ROV of claim 11, further comprising:
   a. concurrently using the first signal protocol transceiver and the third signal protocol transceiver at the first data transmission speed and the second signal protocol transceiver and the fourth signal protocol transceiver at the second data transmission speed; and
   b. cross-connecting the first and third signal protocol transceivers with the second and fourth signal protocol transceivers for diagnostics information subsea.

17. The method of communicating between a remotely operated vehicle (ROV) and a system remote from the ROV of claim 11, further comprising:
   a. enabling only the second data protocol at the second data transmission speed;
   b. adding a fast protocol to slow protocol module; and
   c. using a fast protocol to slow protocol module to allow slow protocol data transmission.

18. The method of communicating between a remotely operated vehicle (ROV) and a system remote from the ROV of claim 17, wherein the allowed slow protocol data transmission comprises RS-232, RS-422, or RS-485.

19. The method of communicating between a remotely operated vehicle (ROV) and a system remote from the ROV of claim 11, further comprising:
   a. using the first data protocol to communicate with a core ROV system at the first data transmission speed;
   b. using the first data protocol to communicate with a tool subsea at the first data transmission speed; and
   c. using the second data protocol to communicate with less important systems at the second data transmission speed.

* * * * *